United States Patent [19]

Aptel et al.

[11] Patent Number: 5,171,493
[45] Date of Patent: * Dec. 15, 1992

[54] PROCESS FOR EXTRUDING SEMI-PERMEABLE MEMBRANE HAVING SEPARATE HOLLOW PASSAGEWAYS

[75] Inventors: Philippe Aptel; Jean-Michel Espenan, both of Toulouse, France

[73] Assignee: Societe Lyonnaise des Eaux (Societe Anonyme), Paris, France

[*] Notice: The portion of the term of this patent subsequent to Feb. 18, 2009 has been disclaimed.

[21] Appl. No.: 456,097

[22] Filed: Dec. 22, 1989

[30] Foreign Application Priority Data

Dec. 22, 1988 [FR] France .................. 88 17370

[51] Int. Cl.⁵ .................................. D01D 5/247
[52] U.S. Cl. ............................. 264/41; 264/209.1; 264/559; 264/561; 264/562; 264/211.16; 210/500.23
[58] Field of Search ............... 210/500.23, 500.31, 210/500.41; 264/41, 209.1, 559, 561, 562, 211.16

[56] References Cited

U.S. PATENT DOCUMENTS

| 4,234,431 | 11/1980 | Mishiro et al. | 210/500.23 |
| 4,481,260 | 11/1984 | Nohmi | 210/500.23 |
| 4,612,119 | 9/1986 | Eguchi | 210/500.23 |
| 4,681,713 | 7/1987 | Miyagi et al. | 210/500.23 |
| 4,822,489 | 4/1989 | Nohmi et al. | 210/500.23 |

FOREIGN PATENT DOCUMENTS

| 0195860 | 10/1986 | European Pat. Off. | 210/500.23 |
| 3022313 | 12/1980 | Fed. Rep. of Germany. | |
| 2445163 | 8/1980 | France. | |
| 2616812 | 12/1988 | France | 210/500.23 |
| 59-82906 | 5/1984 | Japan. | |
| 8102750 | 10/1981 | World Int. Prop. O. | |

Primary Examiner—Hubert C. Lorin
Attorney, Agent, or Firm—Harold H. Dutton, Jr.

[57] ABSTRACT

A process for the production of a porous organic material, in particular an organic semi-permeable membrane, provided with a plurality of separate passageways, comprising dissolving a polymer in a solvent, using a drawplate comprising needles having a shape conjugate with that of the passageways and external dimensions comprising between 0.7 and 1.2 times those of said passageways and an extrusion orifice of a conjugate fome to that of the extrudate and of internal dimensions comprising between 0.8 and 1.2 times those of said extrudate, injecting around the needles a solution having a viscosity greater than 500 millipascal-second, introducing into the interior of the conduits of the drawplate a centering fluid which is a non-solvent with respect to the polymer and able to precipitate the polymeric solution, causing the extrudate to travel from the output of the drawplate a distance da in a gaseous atmosphere which is non-precipitating with respect to the polymeric solution such that $500 \times e < da < 0.8$ m, wherein e is the maximum distance, recovering the extrudate in a liquid bath which is precipitating for the polymeric solution, and taking up the precipitated extrudate with a linear take-up speed Ve such that $Ve/Vs < 1.2$, where Vs is the average extrusion speed.

1 Claim, 1 Drawing Sheet

PROCESS FOR EXTRUDING SEMI-PERMEABLE MEMBRANE HAVING SEPARATE HOLLOW PASSAGEWAYS

This invention relates to a process for the production of a porous organic material, in particular an organic semi-permeable membrane, comprising a plurality of separate longitudinal passageways, the process being of the type comprising dissolving a polymer in a solvent, extruding the solution obtained through an extrusion die provided with a plurality of separate conduits on the interior of which is introduced a fluid, and on the exterior of which flows the solution, and finally precipitating the extrudate obtained.

BACKGROUND AND OBJECTS OF THE INVENTION

Organic semi-permeable membranes provided with a plurality of separate longitudinal passageways have important advantages with respect to conventional hollow fibers. In effect, they have a high mechanical strength which simplifies notably the problems of handling. Moreover, the speeds of production are accelerated due to the fact that a lesser length of membrane is necessary for producing a bundle. Finally, the provision of filtration modules is found to be markedly simplified. Such advantages have led to a development of the use of these membranes in which techniques of production or applications are particularly described in the following patents: DE-A-3,022,313; WO-A-8102750; FR-AL 2,445,163; and JP-A-5982,906. However, the known techniques, and particularly those described in these patents, do not permit the mastery in a rational manner of all of the production parameters for membranes and especially conferring on these membranes particular, predefined structures, and mastery in a precise manner of the external dimensions of these membranes as well as their passageways.

The present invention seeks to fulfill these deficiencies, and has as its principal object to provide a process permitting providing membranes having a particularly well defined structure and of which the dimensions, as well as the dimensions of their passageways, are precisely defined.

DESCRIPTION OF THE INVENTION

To this end, the invention provides a process characterized in:

using a drawplate comprising needles of a shape conjugate with those of the passageways and of external dimensions comprising between 0.7 and 1.2 times those of said passageways and an extrusion orifice of a conjugate shape to that of the extrudate and of internal dimensions between 0.8 and 1.2 times those of said extrudate, arranging the drawplate in such a manner as to extrude the solution essentially vertically, injecting around the needles a solution having a viscosity greater than 500 millipascal seconds (as measured with a "Contraves" Rheomat 115, rate of shearing of 28 $s^{-1}$) with a flow adapted in such a manner as to obtain an average speed of extrusion $V_s$ at the output of the extrusion plate, introducing into the interior of the conduits of the drawplate a centering fluid which is a non-solvent with respect to the polymer and able to precipitate the polymeric solution, causing the extrudate to travel at the output of the drawplate a distance 'da' in a gas atmosphere which is non-precipitating with respect to the polymeric solution with 'da' being such that: $500 \times e < da < 0.8$ m, where e represents the maximum distance of travel by the precipitating fluid on the interior of the extrudate for obtaining complete precipitation of said extrudate, collecting the extrudate in a bath of a liquid which is not a solvent with respect to the polymer and is able to precipitate the polymeric solution, taking up the precipitated extrudate with a linear take-up speed $V_e$ such that $V_e/V_s < 1.2$.

This process permits producing membranes comprising a plurality of separate longitudinal passageways extending through a polymeric material composed of active semipermeable layers on the surface of each passageway and an intermediate thickness of a porosity greater that that of said active layers.

The interest in such membranes resides in the fact that the active layers constitute a filtration screen avoiding the filtration taking place in the depth of the polymeric material, and by the same manner that the membranes do not become irreversibly saturated.

Further, the presence of these active layers on the surface of the passageways is particularly adapted to permit the filtration of loaded fluid flowing in these passageways, by reason of the absence of dead zones where the filtration cake would accumulate. Finally, by reason of their modularity, the passageways present from one to another the same treatment conditions and therefor permit precise control of the filtration parameters.

All of the operative conditions carried out in this process are adapted to obtain total precipitation of the polymeric material before recovering the extrudate in the non-solvent liquid bath and consequently obtaining the structure hereinabove described, while precisely controlling the stretching phenomenon of this extrudate which conditions the external dimensions of the membrane as well as those of the passageways.

According to a preferred embodiment, the drawplate comprises an extrusion orifice having a perimetrical surface of an undulated form comprised of a succession of undulations facing the peripheral needles and depressions between two of said peripheral needles.

Such a drawplate thereby presents a cross-section in a "marguerite" shape for providing a cylindrical membrane, which will comprise two longitudinal, parallel, undulated faces for the provision of a planar membrane.

The use of such a drawplate permits better control of the parameter corresponding to the maximum distance covered by the precipitating fluid and as a consequence more easily achieving a good overall precipitation compromise, completely controlled.

DESCRIPTION OF THE DRAWINGS

The invention will be better understood from a reading of the detailed description which follows in reference to the accompanying drawings which show by way of non-limiting example a preferred embodiment. In these drawings which form an integral part of the present description.

DETAILED DESCRIPTION OF PREFERRED EMBODIMENTS

Figure 1:
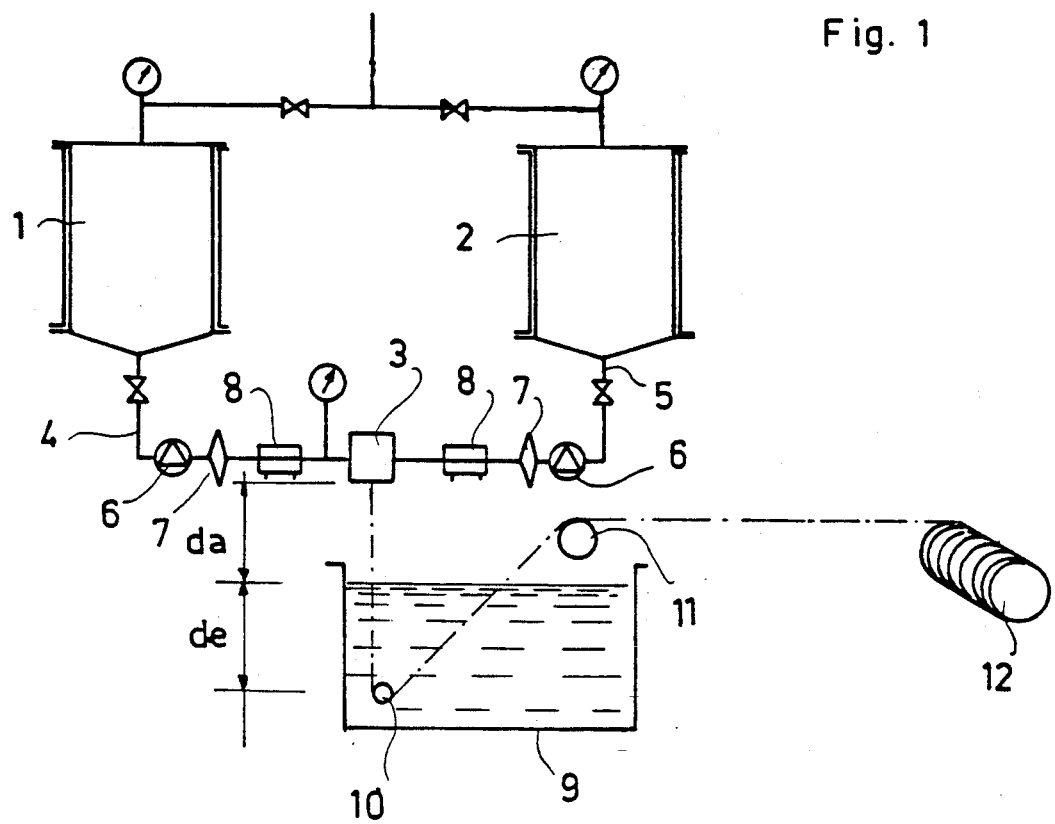
FIG. 1 is a schematic diagram illustrating a production process according to the invention.

The polymeric solution obtained by dissolution of a polymeric material in a solvent is initially stored in a reservoir 1. In a parallel manner, a centering fluid is stored in a reservoir 2. This centering fluid is a fluid which is not a solvent with respect to the polymer, and is able to precipitate the polymeric solution.

Each of these reservoirs 1, 2 is connected to a drawplate 3 by means of feed conduits 4, 5 arranged such that the centering fluid flows through the interior of the needles of this drawplate 3 and the polymeric solution on the exterior of said needles.

The drawplate 3 comprises needles of a shape conjugate with that of the passageways of the membrane to be produced and of external dimensions comprising between 0.7 and 1.2 times that of said passageways. It comprises further an extrusion orifice of a shape conjugate with that of the extrudate, that is, of a cylindrical shape for the production of a cylindrical membrane or of a rectangular shape of small width with respect to its length for the production of a planar membrane. The internal dimensions of this extrusion orifice comprise between 0.8 and 1.2 times that of the membrane to be produced.

Each of the conduits is provided with a circulation pump 6, a filter 7 and a heat exchanger 8 adapted to maintain a constant temperature of the fluid and the solution.

Directly below this drawplate 3, arranged in such a manner as to extrude the solution essentially vertically, is a recovery tank 9 filled with a liquid which is a non-solvent with respect to the polymer and which is able to precipitate the polymeric solution. The recovery tank 9 is positioned a distance from the drawplate 3, such that the extrudate travels a distance 'da' before reaching the surface of the liquid.

In the bottom of this tank 9 is also arranged a pulley 10 permitting the guiding, along with another pulley 11, of the membrane toward a spool 12.

The linear take-up speed Ve of this spool 12 is controlled as a function of the average extrusion speed Vs at the output of the drawplate 3, in such a manner that $Va < Vs < 1.2$. The first return pulley 10 is arranged in the recovery tank 9 as a depth such that the extrudate travels vertically a distance in the liquid before coming into contact with this return pulley.

An example of the operation adapted to produce a planar membrane provided with seven passageways comprising an active layer on their surface, is described hereinbelow.

Figure 2:
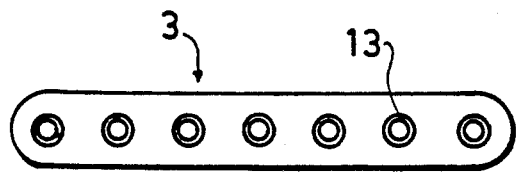
FIG. 2 is a schematic view of the face of the drawplate used in the example of operation described in the description.

As is shown schematically in FIG. 2, the drawplate 3 utilized has an essentially rectangular cross-section of which the extrusion orifice comprises a linear length of 12.8 mm and a width of 2 mm. On the interior of this drawplate 3 are arranged seven needles 13 of an external diameter 0.81 mm and of internal diameters of 0.51 mm. The distance separating two needles 13 is 0.89 mm.

With such a drawplate, it has been proven that the maximum distance of travel by the precipitating fluid for flowing on the surface of the extrudate is on the order of 1 mm.

The recovery tank 9 is placed under the drawplate 3 in such a manner that the distance 'da' is 62 cm, while the return pulley 10 is arranged in this tank 9 at a depth such that de=28 cm.

The polymeric solution used has the following composition (mass %):

| | |
|---|---|
| Polyetherimide "ULTEM 1000" as granules from General Electric Plastics: | 18% |
| Polyethylene glycol 400 (400 being the average molecular mass): | 22% |
| N-methylpyrrolidone | 60% |

At the extrusion temperature of 30° C., this solution has a viscosity of 5,400 m.pa.s measured with a Rheomat 115 from Contraves, at a rate of shear of 28 $s^{-1}$. Further, it is extruded at a flow rate Qs=211 $cm^3$/mn.

The centering fluid used is water which is introduced into the needles 13 with a flow rate Qf=138 $cm^3$/mn.

Finally, the take-up spool is controlled in such a manner that the linear take-up speed Ve=10.0 m/mn.

Under these conditions, the product obtained is a membrane comprising 7 passageways each provided with an active layer at their surface, and an intermediate thickness of porosity greater than that of the active layers.

This membrane has a length of 12 mm and a thickness of 1.9 mm, the internal diameter of each of the passageways being 0.95 mm. Finally, the hydraulic permeability value, measured while introducing a liquid into the passageways, is $5.6 \times 10^{-10}$ m/s.pa for water at 25° C. and a p of $0.1 \times 10^5$ Pa to $1 \times 10^5$ Pa.

While this invention has been described as having certain preferred features and embodiments, it will be apparent that the invention is capable of still further variation and modification without departing from the spirit of the invention, and this application is intended to cover any and all variations, modifications and adaptations which come within the spirit of the invention and the scope of the appended claims.

We claim:

1. A process for the production of a porous organic semi-permeable membrane comprising dissolving a polymer in a solvent to form a solution, extruding the solution thus obtained through a drawplate (3) having a plurality of separate conduits (13), introducing through the interior of said conduits at least one centering fluid, and causing said solution to flow on the exterior of said conduits in such a manner as to form an extrudate having a plurality of longitudinal passageways, and precipitating said extrudate, said drawplate (3) comprising needles (13) of a shape conjugate with that of the conduits and of external dimensions comprising between 0.7 and 1.2 times that of said passageways, and an extrusion orifice of a shape conjugate with that of the extrudate and having internal dimensions comprising between 0.8 and 1.2 times that of said extrudate, arranging said drawplate (3) in such a manner as to extrude the solution in an essentially vertical direction, said solution having a viscosity greater than 500 millipascal seconds ("Contraves, Rheomat 115, rate of shear of 28 $s^{-1}$) with a flow rate adapted in such a manner as to obtain an average extrusion speed Vs at the output of the drawplate, introducing into the interior of the conduits of the drawplate (3) a centering fluid which is non-solvent with respect to said polymer and able to precipitate the polymeric solution, causing the extrudate to travel at the output of the drawplate a distance da in a gaseous atmosphere which is non-precipitating with respect to said polymeric solution such that $500 \times e < da < 0.8$ m, where e is the maximum distance in meters traversed by the precipitating fluid on the interior of the extrudate for obtaining the complete precipitation of said extrudate, recovering the extrudate in a bath which is a non-solvent with respect to the polymer and able to precipitate the polymeric solution, and taking up the precipitated extrudate with a linear take-up speed Ve such that $Ve/Vs < 1.2$.

* * * * *